3,356,618
COATED BORON CONTAINING MATERIAL DISPERSED IN A METAL MATRIX

John Rich, Didcot, and George Arthur, Newcastle-upon-Tyne, England, assignors to International Research & Development Company Limited, Newcastle-upon-Tyne, England
No Drawing. Filed Nov. 23, 1964, Ser. No. 413,352
Claims priority, application Great Britain, Nov. 25, 1963, 46,506/63; Mar. 12, 1964, 10,569/64
12 Claims. (Cl. 252—478)

The present invention relates to boron-containing materials and their manufacture.

The use of boron and boron compounds in, for example, neutron absorption control elements for nuclear reactors, has been restricted because bulk boron and solid boron compounds are brittle materials with low resistance to mechanical and thermal shock and form brittle compounds with many common metals. It is an object of the present invention to produce boron-containing materials which have improved mechanical properties.

In accordance with the invention there is provided a boron-containing material having a metal matrix containing coated particles of boron or a boron-compound, the coating of the particles being chemically unreactive with the particles themselves and with the metal of the matrix and preventing reaction between the particles and the matrix.

Preferred boron compounds are boron carbide and zirconium diboride. Because of the hardness of boron carbide, material incorporating it is of value in cutting and drilling tools as well as for reactor control rods and other purposes.

The coating may include compounds selected from the carbides, nitrides and carbo-nitrides of elements in Groups IV, V and VI of the Periodic Table, in particular the refractory carbides of silicon, titanium, zirconium, tantalum, vanadium, chromium, molybdenum and tungsten and silicon nitride. Silicon carbide is particularly suitable for coating boron carbide because of the closeness of their thermal expansion properties, while titanium and tungsten carbides are particularly suitable chemically.

The coating may consist of two layers, one of which has desirable properties in relation to the material of the particle and the other of which has desirable properties in relation to the metal of the matrix. Thus, since silicon carbide shows a small degree of reaction with steel it may be preferable to coat boron carbide particles first with a layer of silicon carbide and then with a layer of titanium carbide, which, while less closely matched to boron carbide in thermal expansion properties than silicon carbide, is less reactive with steel.

It will be understood that reference to the coating being chemically unreactive with the particles and with the metal of the matrix does not mean that no detectable reaction will take place even under extreme conditions, but that the extent of the reaction under normal conditions of use will be less than that between the uncoated particles and the matrix and insufficient to cause any risk of breakdown of the barrier layer provided by the coating.

Examples of the metals which may form the matrix are iron, cobalt, nickel, chromium and zirconium and alloys containing any or all of these metals. The matrix metal may also contain tungsten, titanium or tantalum carbide or mixtures of these carbides, particularly for use in drilling and cutting tools.

In the production of the materials in accordance with the invention the particles can be coated by a fluidised bed technique in which a gaseous composition which at high temperatures produces the coating material, is introduced into a heated fluidised bed of the particles. The gaseous composition may be a single gaseous compound which decomposes or a number of gases which react to produce the coating material. The coated particles can then be included in the metal matrix by standard powder metallurgy techniques. The coating should be wetted by the matrix metal so that on sintering above the melting point of the metal, a strong dense material is obtained. By way of example, the production of boron-containing materials in accordance with the invention for two different purposes will now be described in more detail.

Boron, because of its relative cheapness and abundance compared with other materials having high thermal neutron absorption properties, has been used extensively in nuclear reactors for the control of neutron absorption. Boron, on neutron capture, fissions to produce isotopes of lithium and helium namely $Li^7$ and $He^4$, the nuclei of both of which have low neutron absorption properties. Boron can therefore be used as a burnable poison in a reactor. When boron and solid high temperature boron compounds are used for control rods, they are usually contained in a sheath which provides the necessary resistance to mechanical and thermal shock.

Alloys of boron have also been used in reactors but boron and boron compounds form brittle compounds with most metals of interest, such as iron, nickel, zirconium, titanium and chromium. As a result only small amounts of boron can be incorporated, for example less than 4% by weight.

A similar difficulty would arise if particles of boron or boron comupounds were to be dispersed in a metal matrix by powder metallurgy techniques since some reaction would take place at sintering and fabricating temperatures. This difficulty is substantially reduced by making use of the invention and coating the boron-containing particles with one or more of the carbides previously listed.

By way of example, the application of a coating of silicon carbide will now be described in more detail.

A bed of boron-containing particles preferably, but not necessarily, approximately spherical in shape and of a size lying in the range 50–500μ diameter, is fluidised by means of hydrogen gas at a temperature in the range 1000°–1700° C., the preferred temperature being 1500° C. A suitable boron-containing compound is boron carbide ($B_4C$). A gaseous compound such as trichloromethylsilane $CH_3SiCl_3$ is then introduced and this compound decomposes at such temperatures in the presence of hydrogen to give a dense deposit of silicon carbide.

Other silicon compounds may be used, for example, a mixture of a silicon halide such as silicon tetrachloride and a hydrocarbon such as methane.

After the deposition of silicon carbide on the particles, the particles are incorporated in a metal matrix, using standard powder metallurgy techniques followed by hot pressing, swaging, rolling or extrusion.

Silicon carbide deposited at temperatures below 2000° C. is in the beta (cubic) form which is known to suffer little damage under irradiation.

In choosing the particle material it is desirable to choose a boron-containing material having a coefficient of thermal expansion which is as close as possible to that of silicon carbide in order to avoid temperature stresses in the coating which might lead to its fracture.

In the temperature range of 0–1000° C. the coefficient for silicon carbide is $4.4 \times 10^{-6}$ per °C. The coefficient for boron carbide is $4.5 \times 10^{-6}$ per °C., for zirconium diboride $5.5 \times 10^{-6}$ per °C. and for boron 1.1 to $8.3 \times 10^{-6}$ per °C.

Thus boron carbide has a coefficient very close to that of silicon carbide. Zirconium diboride may be used instead of boron carbide as its coefficient of thermal expansion is sufficiently close to that of silicon carbide to ensure a good conformity of thermal expansion with the silicon carbide. When silicon carbide is formed by the decomposition of trichloromethylsilane, hydrochloric acid is formed at the same time and this tends to attack zirconium diboride. This difficulty can be overcome by a preliminary coating of carbon.

The material formed by the above method is very suitable for use as a control material in a nuclear reactor either as the material of a control rod or dispersed in the reactor as a burnable poison.

In the application of such materials in nuclear reactors it is often desirable to use stainless steel as the matrix metal. In such a case the temperature required for fabrication of the material by powder metallurgy techniques may be high and this may result in some reaction occurring between the steel and the silicon carbide. This problem can be overcome by applying a second coating of a different carbide having similar expansion characteristics to the silicon carbide, for example titanium carbide. The technique of coating would be substantially the same as that described for the deposition of the coating of silicon carbide.

In some circumstances it is possible to dispense with the silicon carbide coating for such reactor applications and substitute a coating of a carbide such as titanium carbide.

Silicon carbide shows good resistance to corrosion by air, steam and carbon dioxide up to 1500° C. so that even in the event of failure of a fuel element can, and penetration of the matrix metal by coolant, contamination of the coolant by the boron-containing material would not take place.

By using a double coating advantage can be taken of these properties of silicon carbide even if high fabrication temperatures are required.

A second application of the invention is to cutting and drilling tools. Boron carbide is only surpassed for hardness by diamond and the cubic form of boron nitride. Diamonds are used successfully in various applications such as in cutting and drilling hard materials but their use is limited by their high cost. The cubic form of boron nitride cannot be produced commercially at the present time.

Boron carbide could be used in cutting or drilling tools if it could be used in cemented form in a metal matrix. A drawback of the material is, however, that it reacts with most metals to form borides which are of lower strength and hardness than the original carbide. The reaction also uses up the matrix metal on which one is dependent for toughness. Copper and aluminium do not react with boron carbide but because of their relative softness they do not make suitable matrix materials for materials to be used for cutting or drilling hard substances.

Boron carbide particles in various size ranges, the range being approximately 10–3000 microns, can be coated with titanium carbide using a fluidised bed technique. This technique involves fluidising a bed of boron carbide particles with titanium tetrachloride and toluene vapours in a hydrogen carrier gas at some temperature above approximately 900° C. For example, angular boron carbide particles of approximately 100 microns in size are placed in a one-inch diameter tube and fluidised, that is to say, kept in suspension, by passing hydrogen at 1 litre-minute through the particle bed. Two secondary hydrogen streams each of approximately 100 cc./min. are introduced into the main hyrogen stream prior to its entering the fluidising bed. One of these secondary streams is passed through titanium tetrachloride at approximately 23° C. and the other secondary stream through toluene at approximately 0° C. prior to joining the main hydrogen stream. The bed is maintained at a temperature in the region of 1200° C.

The coated particles are then mixed with cobalt, cold pressed and sintered at a temperature in the range of 1300° C.–1800° C.

We claim:
1. A boron-containing material comprising particles of boron material, an inert coating on each of said particles, and a metal matrix, said coated particles being dispersed in said matrix and said inert coating preventing reaction between said boron material and the matrix metal.
2. A material as claimed in claim 1 in which the said boron material is selected from the group comprising boron, boron carbide and zirconium diboride.
3. A material as claimed in claim 1 in which the coating includes at least one compound selected from the group comprising the carbides, nitrides and carbo-nitrides of elements in Groups IV, V and VI.
4. A material as claimed in claim 3 in which the selected compound is a refractory carbide.
5. A material as claimed in claim 4 in which the coating consists of a layer of silicon carbide.
6. A material as claimed in claim 4 in which the coating consists of a layer of titanium carbide.
7. A material as claimed in claim 4 in which the coating consists of a layer of tungsten carbide.
8. A material as claimed in claim 1 in which the particles are of boron carbide.
9. A material as claimed in claim 8 in which the coating is of titanium carbide.
10. A material as claimed in claim 9 in which the matrix metal is cobalt.
11. A material as claimed in claim 2 in which the matrix metal is stainless steel.
12. A boron-containing material comprising particles of boron carbide, an inert coating on said particles, and a stainless steel matrix, said coating comprising a first layer of silicon carbide and a second layer of titanium carbide and said coated particles being dispersed in said matrix.

References Cited

UNITED STATES PATENTS

| 2,728,128 | 12/1955 | Sheer et al. | |
| 3,166,614 | 1/1965 | Taylor | 176—91 X |
| 3,179,723 | 4/1965 | Goeddel | 176—91 |

FOREIGN PATENTS

| 593,167 | 2/1960 | Canada. |
| 933,500 | 7/1963 | Great Britain. |

OTHER REFERENCES

Power Reactor Technology, Control-Rod Materials, vol. 4, No. 4 Section VIII; Sept. 1961, pp. 39–46.

CARL D. QUARFORTH, *Primary Examiner.*

BENJAMIN R. PADGETT, *Examiner.*

S. J. LECHERT, JR., *Assistant Examiner.*